United States Patent
Zhang et al.

(10) Patent No.: US 10,859,535 B2
(45) Date of Patent: Dec. 8, 2020

(54) DETECTING DEVICE AND METHOD FOR ACOUSTIC EMISSION ON HIGH-FREQUENCY MOTION RUBBING PAIR SURFACE

(71) Applicant: BEIJING UNIVERSITY OF TECHNOLOGY, Beijing (CN)

(72) Inventors: Caixia Zhang, Beijing (CN); Junmin Chen, Beijing (CN); Zhifeng Liu, Beijing (CN); Mengmeng Liu, Beijing (CN); Congbin Yang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 16/728,633

(22) Filed: Dec. 27, 2019

(65) Prior Publication Data
US 2020/0132636 A1    Apr. 30, 2020

Related U.S. Application Data

(63) Continuation of application No. PCT/CN2017/104327, filed on Sep. 29, 2017.

(30) Foreign Application Priority Data

Sep. 12, 2017    (CN) .......................... 2017 1 0815637

(51) Int. Cl.
*G01N 29/14*    (2006.01)
*G01N 29/27*    (2006.01)
(Continued)

(52) U.S. Cl.
CPC ............ *G01N 29/14* (2013.01); *G01N 29/225* (2013.01); *G01N 29/27* (2013.01); *G01N 29/28* (2013.01); *G01N 2291/023* (2013.01)

(58) Field of Classification Search
CPC ....... G01N 29/14; G01N 29/225; G01N 29/27; G01N 29/28; G01N 2291/023
(Continued)

(56) References Cited

FOREIGN PATENT DOCUMENTS

| CN | 2113858 U | 8/1992 |
|---|---|---|
| CN | 1793835 A | 6/2006 |

(Continued)

OTHER PUBLICATIONS

The International Search Report of corresponding International application No. PCT/CN2017/104327, dated Mar. 28, 2018.
(Continued)

*Primary Examiner* — Tarun Sinha
(74) *Attorney, Agent, or Firm* — J.C. Patents

(57) ABSTRACT

The present disclosure discloses a detecting device and method for acoustic emission on high-frequency motion rubbing pair surface. A linear reciprocating slide system with high efficiency and high conductivity is designed based on the method. Reciprocating linear slide system is the main structure of the detection device which is is composed of probe plate, tight clips, vacuum cover, slip wire and insulation box. The reciprocating slide solves the problem of data distortion caused by high frequency jitter when connecting ordinary data lines, and can realize stable and reliable connection between high frequency reciprocating rubbing experiment and acoustic emission detection equipment. The acoustic emission probe on the surface of rubbing pair connects with the preamplifier by linear reciprocating slide. Real-time monitoring of acoustic emission equipment is realized to obtain the state change of rubbing pair surface during high-frequency reciprocating rubbing, and further analyze the wear mechanism of different rubbing pair.

3 Claims, 9 Drawing Sheets

Figure 1:
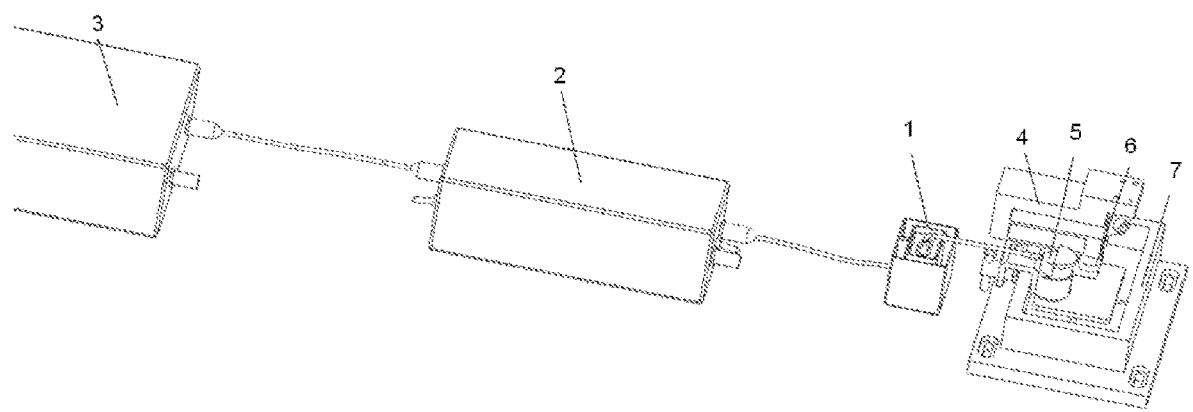

(51) Int. Cl.
*G01N 29/28* (2006.01)
*G01N 29/22* (2006.01)

(58) Field of Classification Search
USPC .......................................................... 73/587
See application file for complete search history.

(56) References Cited

FOREIGN PATENT DOCUMENTS

| | | | |
|---|---|---|---|
| CN | 102680580 A | | 9/2012 |
| CN | 204330686 U | | 5/2015 |
| CN | 106525710 A | | 3/2017 |
| CN | 106546663 A | | 3/2017 |
| CN | 206300859 U | * | 7/2017 |
| CN | 206300859 U | | 7/2017 |
| EP | 2 607 894 B1 | | 10/2015 |

OTHER PUBLICATIONS

The Chinese Search Report of corresponding Chinese application No. 201710815637.X.

* cited by examiner

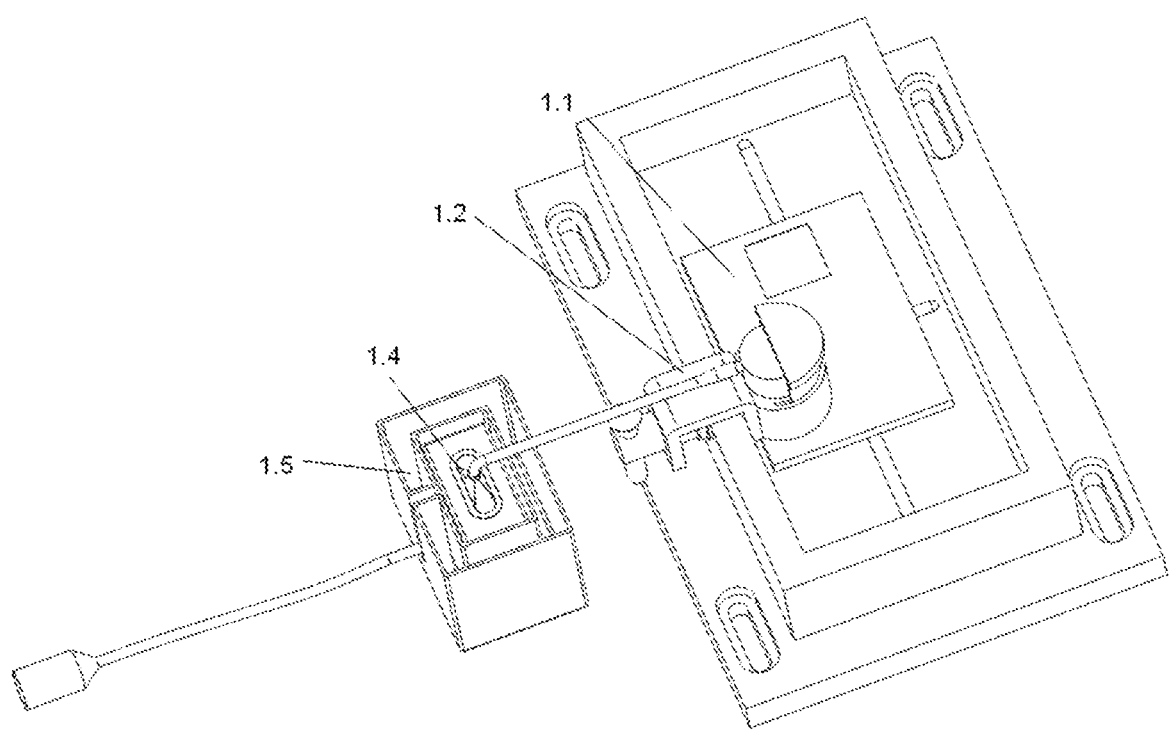
FIG. 2.1

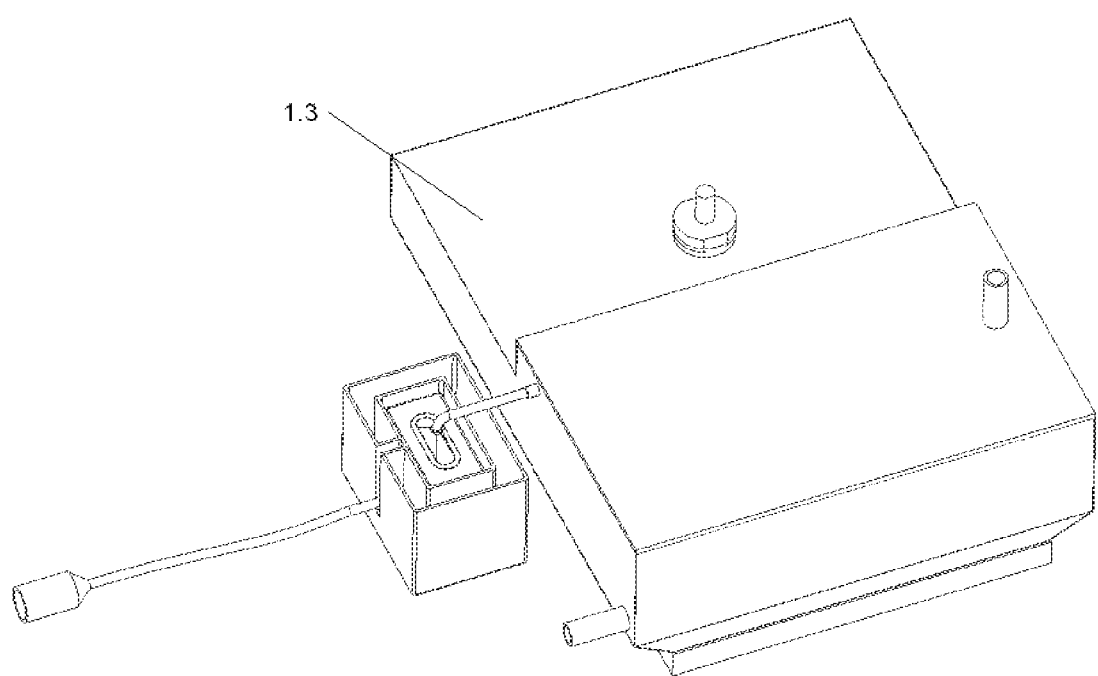
FIG. 2.2

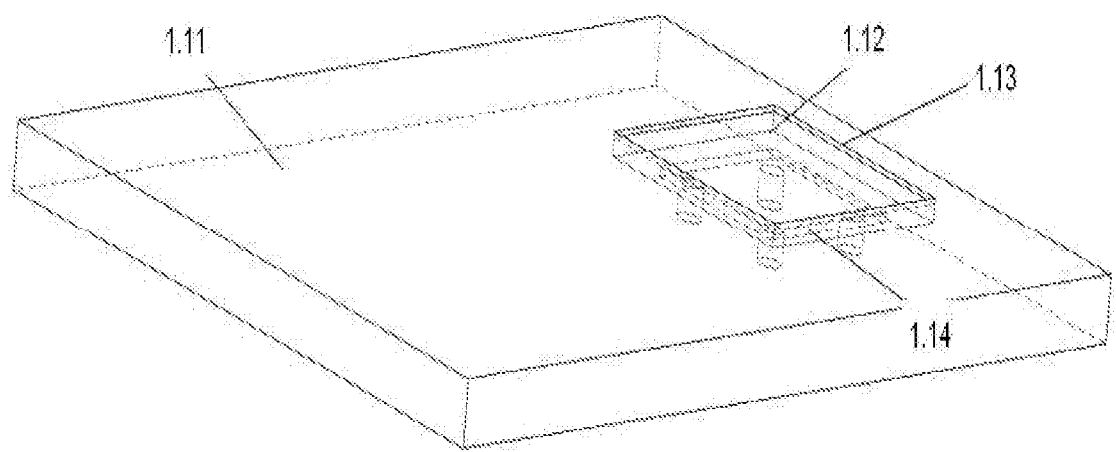
FIG. 3.1

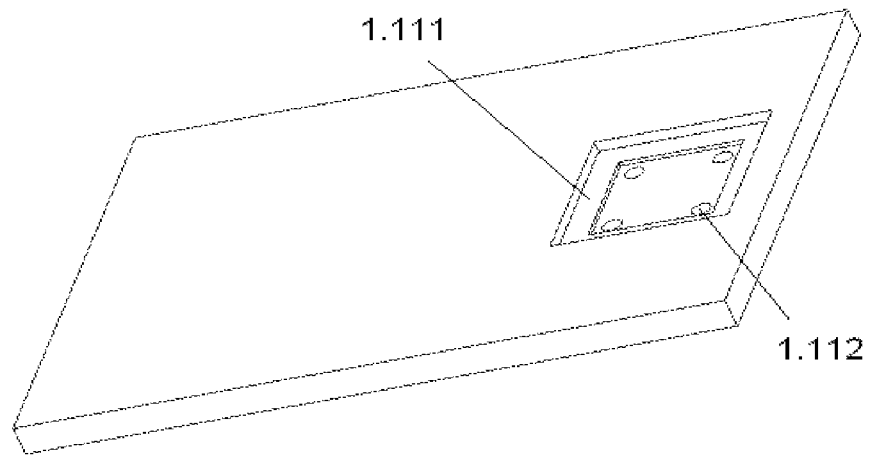
FIG. 3.2
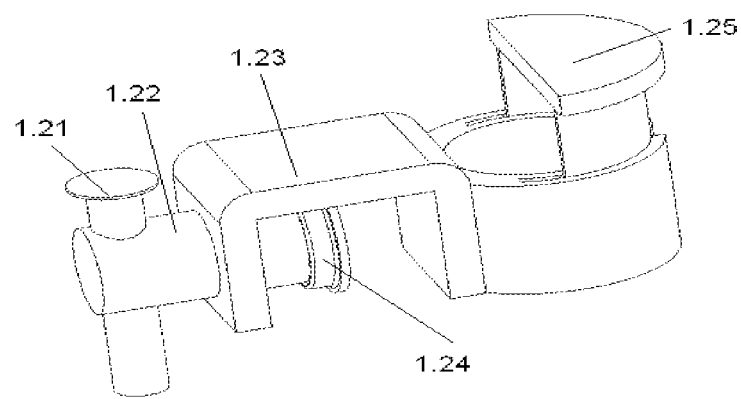
FIG. 4.1

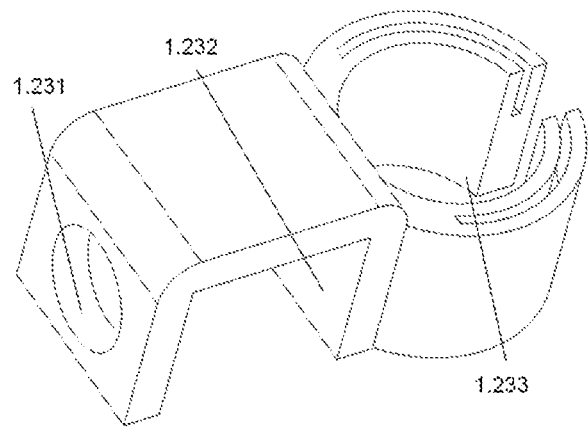
FIG. 4.2
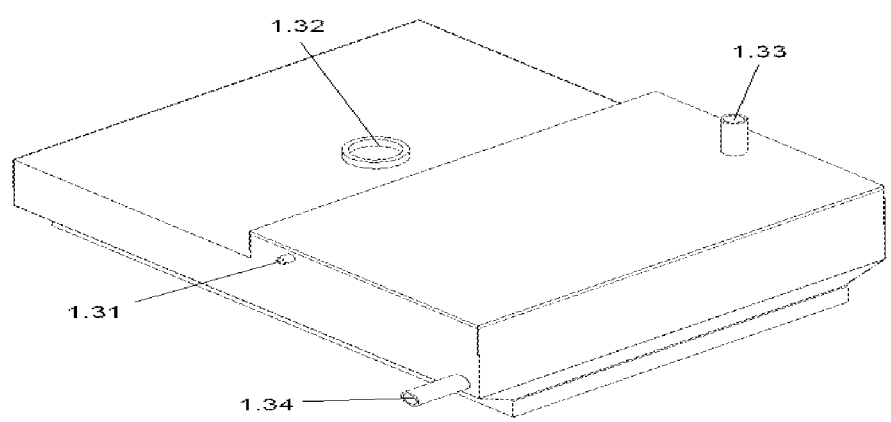
FIG. 5

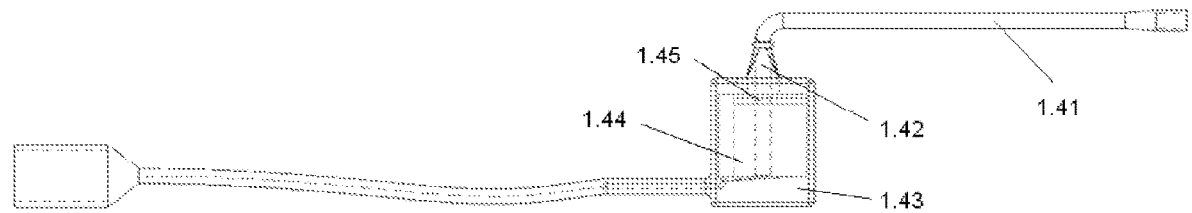
FIG. 6.1
FIG. 6.2

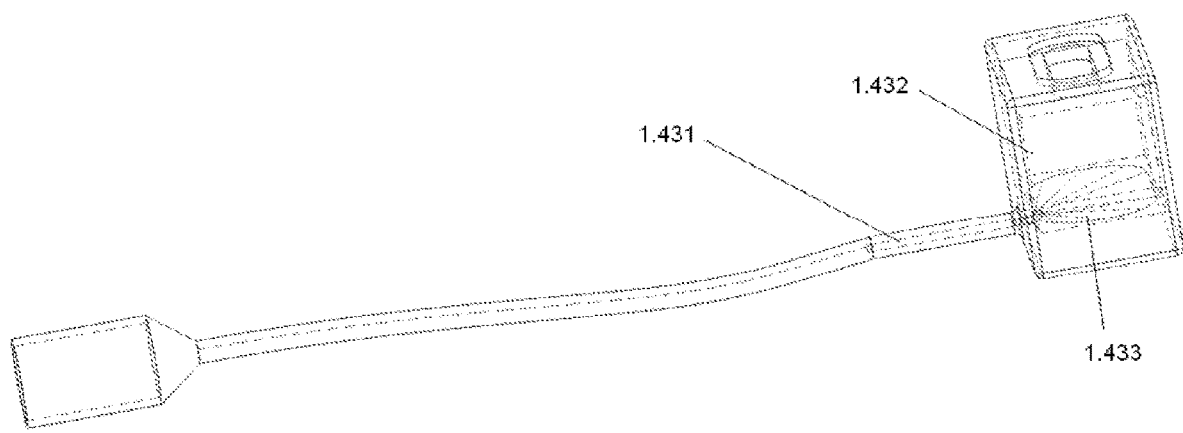
FIG. 6.3
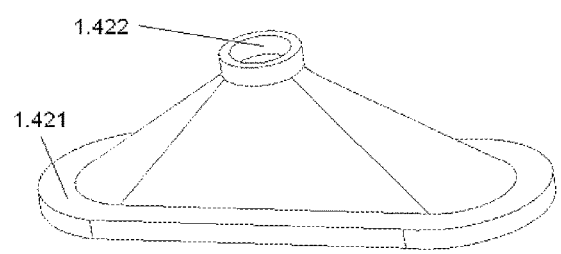
FIG. 6.4

DETECTING DEVICE AND METHOD FOR ACOUSTIC EMISSION ON HIGH-FREQUENCY MOTION RUBBING PAIR SURFACE

CROSS-REFERENCE TO RELATED APPLICATIONS

The present application is a continuation application of International Application No. PCT/CN2017/104327 filed on Sep. 29, 2017 which claims priority to Chinese Patent Application No. 201710815637.X filed on Sep. 12, 2017. The disclosures of the aforementioned applications are hereby incorporated by reference in their entireties.

TECHNICAL FIELD

The present disclosure relates to a detecting device and method for acoustic emission on high-frequency motion rubbing pair surface which belongs to the field of nondestructive testing technology.

BACKGROUND ART

As a dynamic nondestructive testing method, acoustic emission detection is widely used to detect defects such as crack propagation, plastic deformation or phase transition of materials. Combined with tribological testing equipment, the surface state of rubbing pair material can be tested in real time, and the interface wear mechanism can be further analyzed. This method can dynamically monitor the damage mechanism of rubbing pair materials. However, since the rubbing pair moves constantly during rubbing process, conventional method cannot effectively connect the acoustic emission probe on the surface of rubbing pair with the preamplifier.

In order to realize the technical problems that cannot be solved by the traditional methods, the present disclosure discloses a detecting device and method for acoustic emission on high-frequency motion rubbing pair surface. A linear reciprocating slide system with high efficiency and high conductivity is designed based on the method. The reciprocating slide solves the problem of data distortion caused by high frequency jitter when connecting ordinary data lines, and can realize stable and reliable connection between high frequency reciprocating rubbing experiment and acoustic emission detection equipment. The acoustic emission probe on the surface of rubbing pair connects with the preamplifier by linear reciprocating slide. Real-time monitoring of acoustic emission equipment is realized to obtain the state change of rubbing pair surface during high-frequency reciprocating rubbing, and further analyze the wear mechanism of different rubbing pair.

SUMMARY

The present disclosure discloses a detecting device and method for acoustic emission on high-frequency motion rubbing pair surface. Detection of acoustic emission on high-frequency motion rubbing pair is realized through the stable connection between acoustic emission probe and preamplifier.

To achieve the above-mentioned object, the invention discloses a detecting device for acoustic emission on high-frequency motion rubbing pair surface. Reciprocating linear slide system 1 is the main structure of the detection device which is is composed of probe plate 1.1, tight clips 1.2, vacuum cover 1.3, slip wire 1.4 and insulation box 1.5.

Probe plate 1.1 is fixed at the bottom of liquid pool 7 with double-sided adhesive. The tight clips 1.2 which is used to fix the sensor 5 is fixed at the edge of liquid pool and connected to the substrate by coupling grease. The vacuum cover 1.3 is fixed on the side wall of the liquid pool 7. One end of the slip wire 1.4 passes through the vacuum cover 1.3 and is connected to the sensor 5. The insulation box 1.5 is set on the mercury box of slip wire 1.4. Reciprocating linear slide system 1 is placed in the test system composed of preamplifier 2, acquisition card 3, cantilever beam 4, sensor 5, ball support 6 and liquid pool 7 to realize real-time collection of surface wear information of high-frequency moving rubbing pair. The acquisition card 3 is connected to reciprocating linear slide system 1 through preamplifier 2.

Probe plate 1.1 includes test substrate 1.11 and test material 1.12; the test material 1.12 is the sample, which is connected with the test substrate 1.11 through coupling grease 1.14. Non-destructive signal transmission between test substrate 1.11 and test material 1.12 is realized. Test substrate 1.11 is fixed at the bottom of liquid pool 7.

The test substrate 1.11 is connected to sensor 5 by coupling 1.14 to achieve signal transmission. Sensor 5 is fixed to the edge of liquid pool 7 by means of tight clips 1.2. Cork base 6 is fixed to the cantilever beam 4, and the end of cantilever beam 4 is fixed to the UMT sensor. Vacuum cover 1.3 covers the tight clips 1.2, probe plate 1.1 and the Cork base 6; sensor 5 is connected to preamplifier 2 via slip wire 1.4.

The test substrate 1.11 is designed with a stepped groove, and the bulge 1.111 in the middle of the groove is used to fix the test material 1.12, coupling grease 1.14 is filled between the bottom of test material 1.12 and the bulge 1.111. Energy generated during friction process is transferred to the test material 1.12 without loss through the coupling grease 1.14. Test material 1.12 transfers energy through the coupling grease to acoustic emission sensor. There are four cycle holes 1.112 is designed on the bottom of stepped groove which is used for removing the test material after experiment with a hexagon wrench and ensuring the coupling grease 1.14 is evenly filled during the experiment. A reserved groove 1.13 is formed between stepped groove of test substrate 1.11 and the upper surface of test material 1.12. Grease or lubricating oil is put into the reserved groove 1.13. Upper surface of the test material 1.12 contacts lubricating grease/lubricating oil or its lower surface contacts the coupling grease, which is avoid the interaction between lubricating grease/lubricating oil and coupling grease from the spatial layout.

The tight clips 1.2 is composed of tightening rod 1.21, rotating rod 1.22, clamping sleeve 1.23, cushion sleeve 1.24 and top cover 1.25. The tightening rod 1.21 is inserted from the hole of rotating rod 1.22, the rod is connected to the clamping sleeve 1.23 through threaded hole, and the cushion sleeve 1.24 is fixed on the non-hole end of tightening rod 1.21. The top cover is on the ¾ ring of the clamping sleeve 1.23 to form a tight clips 1.2. One side of the clamping sleeve 1.23 is ¾ ring 1.233, it is fit by small gaps, which will not affect the signal acquisition, the freedom of acoustic emission sensor space is constrained. Top cover 1.25 is fastened to the upper side of ¾ ring of clamping sleeve to restrict the freedom of up and down movement of the sensor. Cushion sleeve 1.24 is set on the non-hole end of tightening rod 1.21, and is matched with threaded hole 1.231 on left U-groove 1.232 of the clamping sleeve. Fix the rotating rod 1.22 and fix the tight clips on the side wall of liquid pool 7. The clamp is simple to use and occupies little space.

Vacuum cover 1.3 is fixed by double-sided adhesive on the side wall of the substrate of] liquid pool 7. According to the requirements of the experiment, there are four holes a1.31, b1.32, c1.33 and d1.34 is set on the vacuum cover. The function of each hole is as follows: a1.31 is the hole in outlet wire of the sensor, b1.32 is the hole through which the rubbing top sample passes, a flexible plastic film is set within 10 mm from the edge of b1.32 to meet the reciprocating movement of liquid pool where the top sample is located when the lower sample is fixed. c1.33 and d1.34 are the channel holes of input and output gas in turn.

Vacuum cover 1.3 can realize rubbing experiment in vacuum environment, It is made of rugged noise-proof material, which can greatly reduce the interference of external noise to the experiment and ensure the accuracy of experimental data. The vacuum cover can simulate various experimental environments such as vacuum, high temperature, dry, grinding grease lubrication and oil lubrication under the condition of removing dust, noise and vibration. The slip wire 1.4 is composed of outlet wire 1.41, double-hole cover 1.42 (using polyethylene as raw material), box wire 1.43, mercury 1.44 and oil film 1.45.

One end of the outlet wire 1.41 is inserted into the double-hole cover 1.42, double-hole cover 1.42 covers on the mercury box 1.432 of box wire 1.43. Mercury box 1.432 contains mercury 1.44 in it, which is covered with an oil film 1.45. The outlet wire 1.41 connects with acoustic emission data line and is fixed on the sensor through a threaded, its end bends at a 90 degree Angle. The left side of the box wire is mercury box 1.432, and the base material of mercury box is plastic (polystyrene, etc.), Copper film 1.433 is plated on the bottom of the box, which connects with the copper wire 1.431 in the right. The mercury box contains mercury 1.44 (mercury has a very high conductivity, will not react with the electrode, ion concentration will not be affected by temperature changes), mercury 1.44 is covered with an oil film 1.45 to prevent mercury from volatilization. The bottom hole 1.421 of the double hole cover 1.42 is inserted into oval stepped groove at the top of box. Middle of the double-hole cover is a flexible plastic film, and the end wire of lead wire 1.411 is vertically inserted into the top hole of the double-hole cover 1.422. Adjust the gap between the end wire of lead wire and the copper film at the bottom of the box to 0.1 mm (the best current transmission between the lead wire and the boxbox wire can be realized). The double-hole cover also can prevent mercury from volatilization. The design is safe and pollution-free, which will not cause any safety risks for the experimenter. After the experiment, pull out the lead wire from the top hole and plug up the top hole.

The insulation box 1.5 (using polystyrene as raw material) has an opening at the top and the outer wall of the insulation box is hollow. Add 0° C. water (ice water mixture) in the cavity 1.51. Put mercury box into the insulation box 1.5 to reduce or maintain low temperature status of mercury in the mercury box, nearly 100% mercury conductivity is ensured, so that the test accuracy is improved. Mercury box 1.432 is put into the insulation box 1.5 to ensure that the mercury temperature in the box is not affected by the change of external temperature.

Double-hole cover 1.42 using polyethylene as raw materials. The tight clips 1.2 is made of stainless steel and the vacuum cover 1.3 is made of colorless transparent plastic (polypropylene as raw materials).

The invention improves the acquisition method of acoustic emission signal and solves the problem that the area of sample under test is small (the use of acoustic emission sensor requires the test sample must have a certain area, so as to ensure the normal use of acoustic emission sensor and avoid interference with the top sample during moving process). In this invention, the detection substrate is divided into test substrate and test material. The edge of test material is fixed on the test substrate, and coupling grease is filled between test material and test substrate. During the test, the wear characteristic signal of material can be measured by placing the probe head on the substrate. When testing different samples, we only need to change the material.

The invention solves the problem of inaccurate high-frequency test of acoustic emission equipment caused by signal line high frequency jitter by reciprocating linear slide. The connection between test material and test substrate, test substrate and sensor is filled with coupling grease, which not only realizes the loss-free transmission of signal, but also reduces the requirement of the surface area of test material. The problem of the interaction between lubricating grease/lubricating oil and coupling grease during the experiment is prevent by the test substrate. Test accuracy is ensured.

THE APPENDED DRAWINGS

FIG. 1 is a schematic diagram of reciprocating linear slide test

FIG. 2.1 is a diagram of reciprocating linear slide (hidden vacuum cover)

FIG. 2.2 is a diagram of reciprocating linear slide (with vacuum cover)

FIG. 3.1 is a schematic diagram of probe plate

FIG. 3.2 is a schematic diagram of test substrate

FIG. 4.1 is a schematic diagram of tight clips

FIG. 4.2 is a schematic diagram of clamping sleeve

FIG. 5 is a schematic diagram of vacuum cover

FIG. 6.1 is a schematic diagram of slip wire

FIG. 6.2 is a schematic diagram of lead wire

FIG. 6.3 is a schematic diagram of boxwire

FIG. 6.4 is a schematic diagram of double-hole cover

Figure 7:
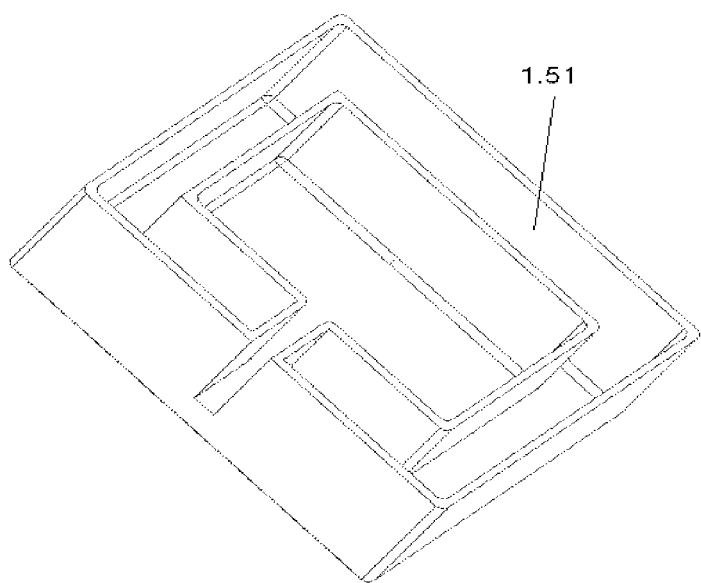

FIG. 7 is a schematic diagram of insulation box

THE PREFERRED EMBODIMENT

As shown in FIG. 1-7, a detecting device for acoustic emission on high-frequency motion rubbing pair surface. Reciprocating linear slide system 1 is the main structure of the detection device which is is composed of probe plate 1.1, tight clips 1.2, vacuum cover 1.3, slip wire 1.4 and insulation box 1.5.

Probe plate 1.1 is fixed at the bottom of liquid pool 7 with double-sided adhesive. The tight clips 1.2 which is used to fix the sensor 5 is fixed at the edge of liquid pool and connected to the substrate by coupling grease. The vacuum cover 1.3 is fixed on the side wall of the liquid pool 7. One end of the slip wire 1.4 passes through the vacuum cover 1.3 and is connected to the sensor 5. The insulation box 1.5 is set on the mercury box of slip wire 1.4. Reciprocating linear slide system 1 is placed in the test system composed of preamplifier 2, acquisition card 3, cantilever beam 4, sensor 5, ball support 6 and liquid pool 7 to realize real-time collection of surface wear information of high-frequency moving rubbing pair. The acquisition card 3 is connected to reciprocating linear slide system 1 through preamplifier 2.

Probe plate 1.1 includes test substrate 1.11 and test material 1.12; the test material 1.12 is the sample, which is connected with the test substrate 1.11 through coupling grease 1.14. Non-destructive signal transmission between test substrate 1.11 and test material 1.12 is realized. Test substrate 1.11 is fixed at the bottom of liquid pool 7.

The test substrate 1.11 is connected to sensor 5 by coupling 1.14 to achieve signal transmission. Sensor 5 is fixed to the edge of liquid pool 7 by means of tight clips 1.2. Cork base 6 is fixed to the cantilever beam 4, and the end of cantilever beam 4 is fixed to the UMT sensor. Vacuum cover 1.3 covers the tight clips 1.2, probe plate 1.1 and the Cork base 6; sensor 5 is connected to preamplifier 2 via slip wire 1.4.

The test substrate 1.11 is designed with a stepped groove, and the bulge 1.111 in the middle of the groove is used to fix the test material 1.12, coupling grease 1.14 is filled between the bottom of test material 1.12 and the bulge 1.111. Energy generated during friction process is transferred to the test material 1.12 without loss through the coupling grease 1.14. Test material 1.12 transfers energy through the coupling grease to acoustic emission sensor. There are four cycle holes 1.112 is designed on the bottom of stepped groove which is used for removing the test material after experiment with a hexagon wrench and ensuring the coupling grease 1.14 is evenly filled during the experiment. A reserved groove 1.13 is formed between stepped groove of test substrate 1.11 and the upper surface of test material 1.12. Grease or lubricating oil is put into the reserved groove 1.13. Upper surface of the test material 1.12 contacts lubricating grease/lubricating oil or its lower surface contacts the coupling grease, which is avoid the interaction between lubricating grease/lubricating oil and coupling grease from the spatial layout.

The tight clips 1.2 is composed of tightening rod 1.21, rotating rod 1.22, clamping sleeve 1.23, cushion sleeve 1.24 and top cover 1.25. The tightening rod 1.21 is inserted from the hole of rotating rod 1.22, the rod is connected to the clamping sleeve 1.23 through threaded hole, and the cushion sleeve 1.24 is fixed on the non-hole end of tightening rod 1.21. The top cover is on the ¾ ring of the clamping sleeve 1.23 to form a tight clips 1.2. One side of the clamping sleeve 1.23 is ¾ ring 1.233, it is fit by small gaps, which will not affect the signal acquisition, the freedom of acoustic emission sensor space is constrained. Top cover 1.25 is fastened to the upper side of ¾ ring of clamping sleeve to restrict the freedom of up and down movement of the sensor. Cushion sleeve 1.24 is set on the non-hole end of tightening rod 1.21, and is matched with threaded hole 1.231 on left U-groove 1.232 of the clamping sleeve. Fix the rotating rod 1.22 and fix the tight clips on the side wall of liquid pool 7. The clamp is simple to use and occupies little space.

Vacuum cover 1.3 is fixed by double-sided adhesive on the side wall of the substrate of] liquid pool 7. According to the requirements of the experiment, there are four holes a1.31, b1.32, c1.33 and d1.34 is set on the vacuum cover. The function of each hole is as follows: a1.31 is the hole in outlet wire of the sensor, b1.32 is the hole through which the rubbing top sample passes, a flexible plastic film is set within 10 mm from the edge of b1.32 to meet the reciprocating movement of liquid pool where the top sample is located when the upper sample is fixed. c1.33 and d1.34 are the channel holes of input and output gas in turn.

Vacuum cover 1.3 can realize rubbing experiment in vacuum environment, It is made of rugged noise-proof material, which can greatly reduce the interference of external noise to the experiment and ensure the accuracy of experimental data. The vacuum cover can simulate various experimental environments such as vacuum, high temperature, dry, grinding grease lubrication and oil lubrication under the condition of removing dust, noise and vibration.

The slip wire 1.4 is composed of outlet wire 1.41, double-hole cover 1.42 (using polyethylene as raw material), box wire 1.43, mercury 1.44 and oil film 1.45.

One end of the outlet wire 1.41 is inserted into the double-hole cover 1.42, double-hole cover 1.42 covers on the mercury box 1.432 of box wire 1.43. Mercury box 1.432 contains mercury 1.44 in it, which is covered with an oil film 1.45. The outlet wire 1.41 connects with acoustic emission data line and is fixed on the sensor through a threaded, its end bends at a 90 degree Angle. The left side of the box wire is mercury box 1.432, and the base material of mercury box is plastic (polystyrene, etc.), Copper film 1.433 is plated on the bottom of the box, which connects with the copper wire 1.431 in the right. The mercury box contains mercury 1.44 (mercury has a very high conductivity, will not react with the electrode, ion concentration will not be affected by temperature changes), mercury 1.44 is covered with an oil film 1.45 to prevent mercury from volatilization. The bottom hole 1.421 of the double hole cover 1.42 is inserted into oval stepped groove at the top of box. Middle of the double-hole cover is a flexible plastic film, and the end wire of lead wire 1.411 is vertically inserted into the top hole of the double-hole cover 1.422. Adjust the gap between the end wire of lead wire and the copper film at the bottom of the box to 0.1 mm (the best current transmission between the lead wire and the boxbox wire can be realized). The double-hole cover also can prevent mercury from volatilization. The design is safe and pollution-free, which will not cause any safety risks for the experimenter. After the experiment, pull out the lead wire from the top hole and plug up the top hole.

The insulation box 1.5 (using polystyrene as raw material) has an opening at the top and the outer wall of the insulation box is hollow. Add 0° C. water (ice water mixture) in the cavity 1.51. Put mercury box into the insulation box 1.5 to reduce or maintain low temperature status of mercury in the mercury box, nearly 100% mercury conductivity is ensured, so that the test accuracy is improved. Mercury box 1.432 is put into the insulation box 1.5 to ensure that the mercury temperature in the box is not affected by the change of external temperature.

Double-hole cover 1.42 using polyethylene as raw materials. The tight clips 1.2 is made of stainless steel and the vacuum cover 1.3 is made of colorless transparent plastic (polypropylene as raw materials).

The invention improves the acquisition method of acoustic emission signal and solves the problem that the area of sample under test is small (the use of acoustic emission sensor requires the test sample must have a certain area, so as to ensure the normal use of acoustic emission sensor and avoid interference with the top sample during moving process). In this invention, the detection substrate is divided into test substrate and test material. The edge of test material is fixed on the test substrate, and coupling grease is filled between test material and test substrate. During the test, the wear characteristic signal of material can be measured by placing the probe head on the substrate. When testing different samples, we only need to change the material.

SR150N sensor 5, SAEU2 acquisition card 3, PXPA6 preamplifier 2 are taken as an example, the acoustic emission detection method is introduced when reciprocating linear slide is used in CETR-UMTS for reciprocating high-frequency rubbing test. Liquid pool 7, ball support 6 and cantilever beam 4 of the reciprocating module are shown in the test.

The installation steps of each part in the test are as follows:

Step 1: fix the probe plate in liquid pool with double-sided adhesive and add an appropriate amount of coupling grease in the groove at the bottom of substrate. Test material is fixed on the test substrate by double-sided adhesive, and grease or lubricating oil or other lubricants are placed in reserved slot in the top surface of test substrate and tested material. In this test, test substrate adopts alloy steel with 40 mm long, 28 mm wide and 1.8 mm thick, test material adopts titanium alloy with 10 mm long, 18 mm wide and 0.5 mm thick.

Step 2: apply coupling grease on test substrate, and fix the sensor on liquid pool with a tight clips. The size of clamping sleeve of the tight clips is determined according to the sensor size.

Step 3: install the lead wire on sensor, put the vacuum cover on (skip this step if the vacuum environment is not required) and fix it. Install and adjust the position of top sample to ensure its ball support inserts into the second hole of vacuum cover. Input inert gas into the vacuum cover and close hole c and d.

Step 4: connect the refrigerated box wire. End wire of the lead outlet is vertically inserted into the top hole of double-hole cover; maintain a 0.1 mm distance between the end surface and copper film in mercury box.

Step 5: connect the preamplifier, acquisition card in turn, switch on the power supply, and conduct the test.

It should be noted that:

1. After the test, box wire should be refrigerated at low temperature.

2. After the test, inert gas must be safely removed, then remove the vacuum cover and test substrate.

3. During the test, the distance between end wire of the lead outlet and copper film should be ensured.

4. Size of the inner cavity of UMT reciprocating module liquid pool must be considered in the dimension design of the test substrate.

What is claimed is:

1. A detecting device for acoustic emission on high-frequency motion rubbing pair surface, comprising: a reciprocating linear slide system which comprises a probe plate, tight clips, a vacuum cover, a slip wire and an insulation box; wherein: the probe plate is fixed at a bottom of a liquid pool; the tight clips which is used to fix a sensor is fixed at an edge of the liquid pool and connected to a substrate by coupling grease; the vacuum cover is fixed on a side wall of the liquid pool; one end of the slip wire passes through the vacuum cover and is connected to the sensor; the insulation box is set on a mercury box of the slip wire; the reciprocating linear slide system is placed in a test system composed of a preamplifier, an acquisition card, a cantilever beam, the sensor, a ball support and the liquid pool to realize real-time collection of surface wear information of high-frequency moving rubbing pair; the acquisition card is connected to the reciprocating linear slide system through the preamplifier; the probe plate includes a test substrate and test material; the test material is connected with the test substrate through a coupling grease; the test substrate is fixed at the bottom of the liquid pool and connected to the sensor by the coupling grease to achieve signal transmission; the sensor is fixed to the edge of the liquid pool by means of the tight clips; a cork base is fixed to the cantilever beam, and an end of the cantilever beam is fixed to a UMT sensor; the vacuum cover covers the tight clips, the probe plate and the cork base; the sensor is connected to the preamplifier via the slip wire; the test substrate is designed with a stepped groove, and a bulge in the middle of the stepped groove is used to fix the test material, the coupling grease is filled between the bottom of test material and the bulge; the test material transfers energy through the coupling grease to an acoustic emission sensor; a reserved groove is formed between the stepped groove of the test substrate and an upper surface of the test material; the tight clips is composed of a tightening rod, a rotating rod, a clamping sleeve, a cushion sleeve and a top cover; the tightening rod is inserted from a hole of the rotating rod, the rotating rod is connected to the clamping sleeve through a threaded hole, and the cushion sleeve is fixed on a non-hole end of the tightening rod; the top cover is on ¾ ring of the clamping sleeve to form the tight clips; one side of the clamping sleeve is ¾ ring, it is fit by small gaps, which will not affect signal acquisition, the freedom of acoustic emission sensor space is constrained; the top cover is fastened to an upper side of the ¾ ring of the clamping sleeve to restrict the freedom of up and down movement of the sensor; the cushion sleeve 1.24 is set on the non-hole end of the tightening rod, and is matched with the threaded hole on a left U-groove of the clamping sleeve; fix the rotating rod and fix the tight clips on the side wall of the liquid pool; the vacuum cover is fixed on the side wall of the substrate of the liquid pool; the vacuum cover can realize rubbing experiment in vacuum environment, which is made of rugged noise-proof material; the slip wire is composed of an outlet wire, a double-hole cover, a box wire, mercury and an oil film; one end of the outlet wire is inserted into the double-hole cover, the double-hole cover covers on a mercury box of the box wire; the mercury box contains mercury therein, which is covered with the oil film; the outlet wire connects with an acoustic emission data line and is fixed on the sensor through a threaded, its end bends at a 90 degree angle; a left side of the box wire is the mercury box, and a base material of the mercury box is plastic, a copper film is plated on the bottom of the mercury box, which connects with the copper wire in a right side; the mercury box contains mercury, the mercury is covered with the oil film to prevent mercury from volatilization; a bottom hole of the double hole cover is inserted into an oval stepped groove at the top of box; in a middle of the double-hole cover is a flexible plastic film, and an end wire of a lead wire is vertically inserted into a top hole of the double-hole cover.

2. A detecting device for acoustic emission on high-frequency motion rubbing pair surface according to claim 1, wherein the double-hole cover adopts polyethylene as raw material; the tight clips is made of stainless steel and the vacuum cover is made of colorless transparent plastic.

3. A detecting method for acoustic emission on high-frequency motion rubbing pair surface according to claim 1, comprising:

Step 1: fix the probe plate in liquid pool with double-sided adhesive and add an appropriate amount of coupling grease in the groove at the bottom of substrate; test material is fixed on the test substrate by double-sided adhesive, and grease or lubricating oil or other lubricants are placed in reserved slot in the top surface of test substrate and tested material;

Step 2: apply coupling grease on test substrate, and fix the sensor on liquid pool with a tight clips; the size of clamping sleeve of the tight clips is determined according to the sensor size;

Step 3: install the lead wire on sensor, put the vacuum cover on and fix it; install and adjust the position of top sample to ensure its ball support inserts into the second hole of vacuum cover; input inert gas into the vacuum cover and close hole c and d;

Step 4: connect the refrigerated box wire; end wire of the lead outlet is vertically inserted into the top hole of double-hole cover; maintain a 0.1 mm distance between the end surface and copper film in mercury box;

Step 5: connect the preamplifier, acquisition card in turn, switch on the power supply, and conduct the test.

\* \* \* \* \*